United States Patent Office 3,529,463
Patented Sept. 22, 1970

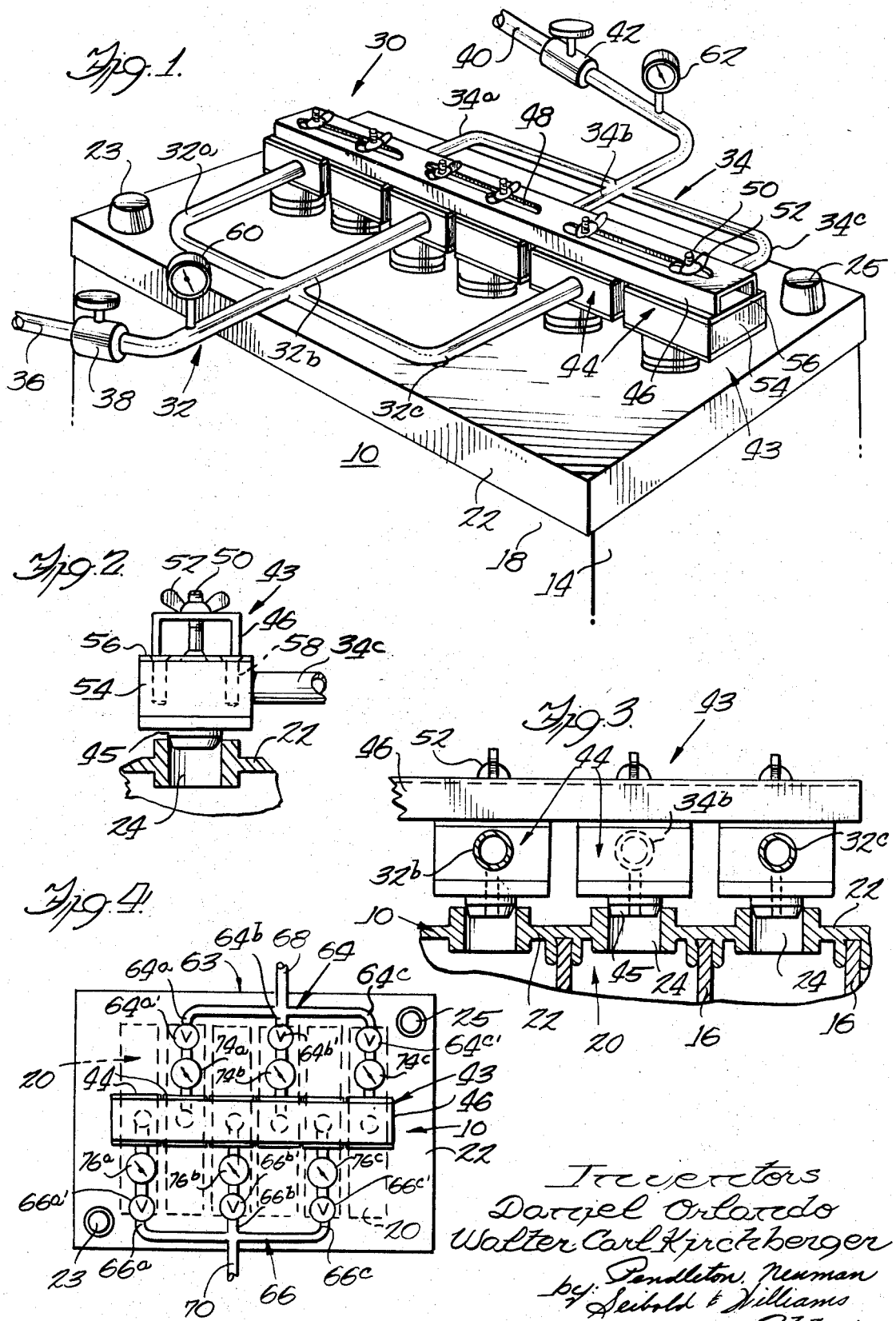

3,529,463
METHOD AND APPARATUS FOR TESTING
BATTERY CASINGS FOR LEAKS
Daniel Orlando, Brookfield, and Walter Carl Kirchberger, Menomonee Falls, Wis., assignors to Gilmore Industries, Inc., Cleveland, Ohio, a corporation of Ohio
Filed Nov. 14, 1968, Ser. No. 775,644
Int. Cl. G01m 3/04
U.S. Cl. 73—49.2                           14 Claims

ABSTRACT OF THE DISCLOSURE

A method and apparatus for testing the cells of a multicell storage battery simultaneously for peripheral and intercell leaks. In one practice of the method a gas pressure differential from a limited supply is developed between the cells and from each cell of the battery casing to ambient simultaneously with pressure changes in adjacent cells being noted. In one apparatus this is accomplished by a pair of manifolds, each having a pressure gauge. One manifold connects alternate cells to a first fluid source of predetermined pressure through a first valve, and the other connects the remaining cells to a second fluid source of different pressure through a second valve.

BACKGROUND OF THE INVENTION

This invention relates to electric storage batteries and more particularly to a method and apparatus for the simultaneous testing of all of the cells of a multicell storage battery for peripheral and intercell leaks.

One of the quality control checks in the manufacture of storage batteries is to determine the fluid tightness of the individual cells of the battery casing. Not only must the cover be sealed to the casing, but the interior walls dividing the casing into the individual cells must also be cemented and sealed to the cover. A leakage through the outer casing will usually occur at the cement joint between the cover and the casing, and a leak between the cells will usually occur at the cement joint between the interior walls and the cover. Leakage may be caused, for example, by a faulty joint or by faulty molding of the cover or partitions. For the most effective quality control, it is desirable, when a leak is detected, to have an indication as to whether the leak is between cells or between a cell and the exterior of the casing. In order to detect possible recurring problem areas such as molding or joint defects, it is desirable to identify the particular cell in which the leak occurs.

The object of this invention is to provide a method and apparatus for testing to determine whether there is a fluid leak in the casing and to ascertain as nearly as possible the nature and location of that leak. The method and apparatus provide an indication as to whether the leak is between cells or between a cell and the exterior of the casing, and they preferably permit identification of the particular cell in which the leak is occurring. The invention enables all of the cells of the battery to be tested for leaks simultaneously.

SUMMARY OF THE INVENTION

In accordance with one embodiment of the invention, the method of testing the cells of a storage battery for peripheral and intercell leaks comprises providing first and second external fluid sources of limited capacity and applying them to alternate cells whereby initial pressure differentials are developed between adjacent cells of the battery and between each cell and ambient, interrupting the fluid flow from the external sources to said cells and thereafter detecting the pressure changes in alternate cells and separately detecting the pressure changes in the remaining cells, whereby pressure changes will indicate leaks in the battery cells, with an intercell leak being indicated by pressure changes in adjacent cells. It may be desirable to interrupt the fluid flow from the external source to each cell separately and to detect the pressure changes in each cell separately so that the leaking cell or cells may be identified.

The development of a pressure differential may be accomplished by placing a first pressure source, which has a predetermined fluid pressure value other than atmospheric, in fluid communication with alternate cells of the battery, placing a second pressure source, which has a predetermined fluid pressure value other than atmospheric and significantly different from that of the first pressure source, in fluid communication with the remaining cells. The fluid communication between the pressure sources and the cells is then interrupted to limit the supply of fluid under pressure to the cells, and any changes in pressure in the cells are observed. For best results one of the pressure sources preferably supplies a pressure greater than atmospheric while the other supplies a pressure less than atmospheric.

In accordance with one embodiment, alternate cells are interconnected by a first manifold, and the remaining cells are interconnected by a second manifold. Pressure changes in each of the two manifolds are then detected after fluid communication between the pressure sources and the manifolds has been interrupted. In accordance with another embodiment, after being subjected to the influence of the pressure sources, the cells are isolated from each other and from the pressure sources, and thereafter pressure changes in each cell are detected separately.

The apparatus may comprise a first pressure source and a plurality of first connectors in fluid communication with the first pressure source. The first connectors include coupling members which sealingly close the filling ports of alternate cells of the battery and place the first pressure source in fluid communication therewith. There is provided a second pressure source having a significantly different fluid pressure than said first source, and a plurality of second connectors are in fluid communication with this second pressure source. The second connectors include coupling members which sealingly close the filling ports of the remaining cells of the battery casing and place the second pressure source in fluid communication with these remaining cells.

In one embodiment the first connectors are connected to each other and to said first pressure source through a first manifold, and the second connectors are connected to each other and to said second pressure source through a second manifold. A first valve or other means is provided for selectively interrupting the supply of fluid from said first pressure source to the first manifold, and a second valve or other means is provided for selectively interrupting the supply of fluid from said second pressure source to the second manifold. There is means associated with each of said manifolds for gauging the fluid pressure therewithin.

In another embodiment, each connector has a cut off valve or other means associated therewith to selectively interrupt fluid communication between the connector and its pressure source, and means is provided for gauging the fluid pressure within the connector and its associated cell.

In both embodiments the valves may be opened to develop significantly different pressures in adjacent cells and then closed to permit observation of any changes in pressure indicative of peripheral and intercell leaks.

BRIEF DESCRIPTION OF THE DRAWING

With reference to the accompanying drawing:

FIG. 1 is a perspective view showing an apparatus comprising one embodiment of the present invention mounted in place for testing of the storage battery casing for leaks, the apparatus being particularly adapted for performing the process of the present invention;

FIG. 2 is an enlarged fragmentary elevational view showing a portion of the battery casing and a portion of the testing apparatus of FIG. 1 in position for the testing of the battery;

FIG. 3 is an enlarged fragmentary elevational view taken at approximately 90° from that of FIG. 2 and showing the relationship between portions of each of the two manifolds and the battery casing; and FIG. 4 is a top plan view schematically illustrating another embodiment of the apparatus and the method of the invention.

DESCRIPTION OF THE PREFERRED EMBODIMENTS

Referring now to FIGS. 1 and 3, there is illustrated a storage battery having a casing 10 defined by end walls 14 and a plurality of interior walls 16. The end walls 14 and the interior walls 16 are preferably formed in a one piece construction including integral side walls 18 and an integral bottom wall (not shown). The interior walls 16 extend between the side walls 18 and are spaced apart in parallel relation to the end walls 14 to define a plurality of cells 20, each of which houses an electrode assembly (not shown).

A cover member 22 closes the top of the casing and is bonded, such as by cement, to the upwardly extending portions of the end walls 14 and the side walls 18 as well as to the upwardly extending portions of the interior walls 16 of the casing. Thus, the casing and cover are maintained in sealing engagement to prevent the electrolyte from communicating between any of the cells of the battery and to prevent the electrolyte from escaping to the exterior of the battery. The cover member 22 is provided with a plurality of ports 24 through which the electrolyte may be charged and through which water may be added to the various cells from time to time. In the illustrated embodiment the battery is divided into six cells by the interior walls 16, and each of the cells 20 thus formed has its own separate port 24 which is the only normal opening into the cell. Each cell contains the usual set of plates and separators (not shown) which are serially connected between terminal posts 23 and 25.

The assembled battery casing may be tested for the presence of leaks with the apparatus and method of this invention, with a quick indication being given as to whether a leak is a peripheral leak, i.e., to the exterior of the casing, or an intercell leak, i.e., through the interior walls of the casing. The battery casing 10 shown in FIG. 1 has six individual cells, and the illustrated apparatus 30 is adapted to test simultaneously all six cells of that casing for leaks. This apparatus includes a pair of fluid manifolds 32 and 34. The first manifold 32 is connected to a first source of fluid pressure such as a pressurized air line 36 through a main valve 38. The second manifold 34 is connected to a second fluid pressure source having a significantly different fluid pressure than the air line 36, this source being preferably a negative pressure or vacuum line 40. The connection between line 40 and the second fluid manifold is through a second main valve 42.

The pressures supplied by lines 36 and 40, whether positive or negative, should not only be significantly different from each other, but they should be other than atmospheric pressure. It is necessary to develop a pressure differential between the interior and the exterior of every cell and thus between cells of the battery casing if the apparatus is used to check all cells simultaneously. Good results are obtained if, for example, the line 36 supplies air under a pressure of 3 p.s.i. greater than atmospheric and the line 40 develops a vacuum or negative pressure of 3 p.s.i. less than atmospheric. It is desirable to balance the positive and negative pressures thusly so that no resultant net force exists on the cover in either direction. In any event the pressure differentials either between adjacent cells or between a cell and the outside of the casing must be maintained at a level below that which would normally tend to cause failure of otherwise sound seals.

Since in the illustrated embodiment the battery being tested is a six cell storage battery, each of the manifolds 32 and 34 has three branching fluid conduits, the manifold 32 having conduits 32a, 32b and 32c and the manifold 34 having conduits 34a, 34b and 34c. The conduits of manifold 32 are connected to alternate cells of the battery casing, and the conduits of manifold 34 are connected to the remaining cells.

The means 43 for effecting the connection between each conduit and a respective one of the battery cells is best illustrated in FIGS. 2 and 3. At the end of each conduit there is a connector or coupling member 44 having an apertured resilient tip 45 which is adapted to be sealingly force-fitted into one of the ports 24 of one of the cells 20, thereby placing the cell in fluid communication with the particular manifold.

It is preferred that the coupling members 44 be mounted for adjustable positioning with respect to one another so that the apparatus may be used to test various sizes of battery casing and may be adjusted to accommodate wear and the like. For this purpose the branching fluid conduits of the two fluid manifolds 32 and 34 are flexible, and the coupling members 44 are mounted on a single channel bar 46. The channel bar 46, preferably, has a plurality of elongated slots 48, and each of the coupling members 44 is adjustably mounted with respect to each other and with respect to bar 46 by means of a bolt 50 which extends upwardly through the slot 48 in the channel bar 46 and has a wing nut 52 threaded on the end thereof. Each coupling member, preferably, has a blocklike body portion 54, and the bolt 50 may be connected to the top of the coupling member by means of a plate 56 attached to the body portion 54 with screws 58. By merely loosening the wing nuts 52, the coupling members 44 may be adjustably positioned with respect to one another and then locked in the desired position by tightening the wing nuts. The tips 45 of the coupling members are each sealingly disposed within a respective one of the filling ports of the battery casing, with alternate coupling members and cells being in fluid communication with the manifold 32 and the remaining coupling members and cells being in fluid communication with the manifold 34. The manifold 32 carries a pressure gauge 60, and the manifold 34 carries a gauge 62 which in this instance is a vacuum gauge.

In order to test the battery for peripheral and intercell leaks, the first pressure source or air line 36 having a predetermined pressure is placed in fluid communication with alternate cells of the battery through the valve 38 and the manifold 32. The second pressure source 40, which is preferably a source of predetermined negative pressure or vacuum, is placed in fluid communication with the remaining cells of the battery through the valve 42 and the second manifold 34. Thus, a pressure is developed in alternate cells by pressurized air from line 36, and a vacuum is developed in the remaining cells by the vacuum line 40. The valves 38 and 42 are then closed to interrupt the fluid communication between the pressure sources 36 and 40 and their respective manifolds 32 and 34. This provides a limited volume of air at non-atmospheric pressure, whereby any leakage will result in a pressure change. The gauges 60 and 62 are then observed for any changes in pressure which would indicate a leak in the battery casing. If either one or both of the gauges show a change in pressure, a leak is indicated, and the type of leak is determined by whether one or both of the gauges show changes in the pressure. If only one of the gauges shows a change in pressure, then a peripheral leak in the battery casing is indicated whereas if both of the gauges show corresponding changes, an intercell leak is indicated since the pressure from one cell is dissipating through the leak area into the remaining cell which is under a reduced pressure or partial vacuum. It is also possible that both gauges will show changes but the changes will be different, indicating the possibility of leakage both between adjacent cells and to the atmosphere.

It is important to note that the pressure changes as shown on the gauges merely "indicate" a particular type of leak. It is possible, though certainly not probable, for there to be a peripheral leakage to the atmosphere in one or more of the alternate cells which would exactly equal the rate of peripheral leakage in one or more of the remaining cells. The two gauges would then show corresponding changes in pressure in the two manifolds, falsely "indicating" an intercell leak. The statistical probability of this happening is quite low, however, and the probability of a false indication is even further reduced by using the apparatus of the second embodiment illustrated in FIG. 4.

In the embodiment of FIG. 4 the apparatus 63 is utilized to simultaneously test all six cells of the battery casing 10 for leaks. The apparatus 63 includes a pair of fluid manifolds 64 and 66. The first manifold 64 is connected to a first source of fluid pressure such as a pressurized air line 68. The second manifold 66 is connected to a second fluid pressure source which is preferably a vacuum line 70.

Each of the manifolds 64 and 66 has three branching fluid conduits, with the manifold 64 having conduits 64a, 64b and 64c, and the manifold 66 having conduits 66a, 66b and 66c. Each conduit in turn has a cut-off valve for selectively interrupting fluid flow through the conduits between the manifolds and the cells being tested. Thus, conduits 64a, 64b and 64c have cut-off valves 64a', 64b' and 64c' respectively, and conduits 66a, 66b and 66c have cut-off valves 66a', 66b' and 66c' respectively. The cut-off valves may replace or be used with the main valves 38 and 42 of the previously described embodiment.

The means for effecting the connection between each conduit and a respective one of the battery cells is preferably the means 43 shown in FIGS. 1–3 and described in connection with the previous embodiment. This connecting means 43 includes the connectors or coupling members 44 and the means for adjustably positioning these coupling members with respect to one another.

In this embodiment, however, instead of the manifold gauges 60 and 62, a separate gauge is provided between each cut-off valve and the cell being tested. Thus, between the cut-off valves 64a', 64b' and 64c' and their associated coupling members 44, there are gauges 74a, 74b and 74c respectively, and between the cut-off valves 66a', 66b' and 66c' and their associated coupling members 44, there are gauges 76a, 76b and 76c respectively. It will be apparent that the gauges may connect directly to the coupling members 44 rather than to the conduits, and, in fact, the cut-off valves may be within the coupling members. After the initial differential has been developed between the pressures in adjacent cells, the cells may be isolated from each other by closing the associated cut-off valves, and any pressure changes within a cell will be indicated on the gauge associated with the particular cell and coupling member. Each leaking cell may thus be easily and separately identified. This capability permits the determination of specific recurring problem areas, such as may result, for example, from a particular mold producing out-of-tolerance partitions or covers or from a heat seal platen producing an inadequate seal at a particular location.

The method and apparatus of this invention permit all cells of the battery to be checked simultaneously for leaks, providing a quick indication as to whether the leak is intercell or peripheral. If desired, the two manifolds may be incorporated into a single unit in side-by-side relationship, and the valves may be operated as a unit and by solenoid or other power means if semi-automated operation is desired.

It is to be understood that the present disclosure has been made only by way of example and that many additional modifications, changes, and various details may be resorted to without departing from the spirit and scope of the invention as hereinafter claimed.

What is claimed is:

1. A method of testing the cells of a battery casing for peripheral and intercell leakage comprising the steps of substantially sealing any normal openings in said cells, developing from external pressure sources an initial differential between the pressures in adjacent cells and an initial differential between the pressure in each cell and the pressure surrounding said casing, interrupting the fluid communication between the external sources and said cells, and detecting relative pressure changes in said cells, whereby changes in pressure will indicate leaks in the battery cells, with intercell leaks being indicated by pressure changes both in the alternate cells and in the remaining cells.

2. The method according to claim 1 wherein fluid communication between said cells is interrupted simultaneously with the interrupting of the fluid communication between the external sources and said cells, and the relative pressure changes in each cell are detected separately but simultaneously with the other cells.

3. The method according to claim 1 wherein the initial pressure differentials are developed simultaneously.

4. The method according to claim 1 wherein said pressure initial differentials are developed by applying a first pressure to the interior of the alternate cells, a second significantly different pressure to the interior of the remaining cells, and a third significantly different pressure to the exterior of the entire casing.

5. The method according to claim 2 wherein one of said pressures is atmospheric.

6. The method according to claim 3 wherein of the remaining two pressures one is greater than atmospheric and the other is less than atmospheric.

7. A method of simultaneously testing all of the cells of a multicell battery casing for peripheral and intercell leaks, comprising, substantially sealing the normal openings in said cells, connecting a first pressure source having a predetermined pressure value to alternate cells through a first valve and first manifold connector having a first pressure gauge, connecting a second pressure source having a predetermined pressure value significantly different from said first pressure source to the remaining cells through a second valve and a second manifold connector having a second pressure gauge, closing said first and second valves, and observing said first and second pressure gauges for changes in pressure, whereby if only one of said gauges shows a change in pressure a peripheral leak is indicated and if both gauges show a change an intercell leak is indicated.

8. An apparatus for testing the cells of a multicell storage battery for peripheral and intercell leaks, each cell of the battery being provided with a filling port, said apparatus comprising a first fluid manifold, means for gauging the fluid pressure within said first manifold, said first manifold having means sealingly closing filling ports of alternate cells of the battery and placing said first manifold in fluid communication with these cells, a second fluid manifold, means for gauging the fluid pressure within said second manifold, said second manifold having means sealingly closing the filling ports of the remaining sells of the battery and placing said second manifold in fluid communication with these remaining cells, first and second fluid pressure sources having significantly different fluid pressures, first means operatively connecting said first fluid source to said first fluid manifold and adapted to interrupt the communication therebetween, and second means operatively connecting said second fluid source to said second fluid manifold and adapted to interrupt the communication therebetween, whereby significantly different pressures may be initially deevloped in adjacent cells and during interruption of the communication between the manifolds and their respective sources any changes in pressure will be indicative of peripheral and intercell leaks.

9. The apparatus of claim 8 wherein said means closing said ports and placing said manifolds and said battery cells in fluid communication comprises a plurality of separate coupling members each having a tip at least a portion of which is adapted to sealingly engage a filling and venting port of the battery.

10. The structure of claim 9 wherein each of said manifolds includes flexible conduit means connecting said manifold to its respective coupling members.

11. The structure of claim 10 wherein means is provided adjustably connecting said coupling members together.

12. The structure of claim 11 wherein said connecting means includes an elongated element and means for locking each of said coupling members in desired location along the longitudinal axis of said element.

13. The structure of claim 12 wherein said elongated element has at least one longitudinal slot and each of said coupling members is provided with an externally threaded post extending through the slot and carrying an internally threaded element for locking said coupling member post in the desired location in said slot.

14. An apparatus for testing the cells of a multicell storage battery for peripheral and intercell leaks, each cell of the battery being provided with a filling port, said apparatus comprising first and second fluid pressure sources having significantly different fluid pressures, a first fluid manifold in fluid communication with said first pressure source, means including a plurality of first connectors sealingly closing filling ports of alternate cells of the battery and placing said first manifold in fluid communication with these cells, a second fluid manifold in fluid communication with said second pressure source, means including a plurality of second connectors sealingly closing the filling ports of the remaining cells of the battery and placing said second manifold in fluid communication with these remaining cells, means selectively interrupting the fluid communication between said first manifold and each of said first connectors and between said second manifold and each of said second connectors, and means for detecting the changes in fluid pressure within each of said cells during interruption of the fluid communication between said manifolds and said connectors.

References Cited

UNITED STATES PATENTS

| | | | |
|---|---|---|---|
| 2,098,677 | 11/1937 | Saballus et al. | 73—40 XR |
| 2,383,936 | 9/1945 | Hohl | 73—40 |
| 2,811,852 | 11/1957 | Shuck et al. | 73—47 |
| 3,360,984 | 1/1968 | Salsbury et al. | 73—49.7 |
| 3,412,601 | 11/1968 | Hand et al. | 73—49.2 XR |

S. CLEMENT SWISHER, Primary Examiner

W. A. HENRY II, Assistant Examiner

PO-1050
(5/69)

UNITED STATES PATENT OFFICE
CERTIFICATE OF CORRECTION

Patent No. 3,529,463               Dated September 22, 1970

Inventor(s) Daniel Orlando and Walter Carl Kirchberger

It is certified that error appears in the above-identified patent and that said Letters Patent are hereby corrected as shown below:

In the title block, the assignor should read --Globe-Union Inc., Milwaukee, Wisconsin, a corporation of Delaware-- instead of "Gilmore Industries, Inc., Cleveland, Ohio, a corporation of Ohio".

SIGNED AND
SEALED
DEC 1 1970

(SEAL)
Attest:

Edward M. Fletcher, Jr.
Attesting Officer

WILLIAM E. SCHUYLER, JR.
Commissioner of Patents